United States Patent Office.

SAMUEL G. RICE, OF ALBANY, NEW YORK.

Letters Patent No. 106,207, dated August 9, 1870; antedated August 5, 1870.

IMPROVED MODE OF TREATING TOBACCO.

The Schedule referred to in these Letters Patent and making part of the same.

*To all whom it may concern:*

Be it known that I, SAMUEL G. RICE, of the city and county of Albany, in the State of New York, have invented an Improved Mode of Treating Tobacco; and I do hereby declare that the following is a full, clear, and exact description thereof.

The object of my invention is to improve tobacco which is designed for smoking and chewing, by the addition thereto of another vegetable substance which possesses many of the properties of tobacco, and which will render the manufactured article cheaper, lighter, and less injurious than the pure tobacco, as will be hereinafter explained.

The following is a description of the best modes known to me of preparing my improved tobacco:

I take, say, one-third leaf-tobacco, one-third stems that have been stripped from their leaves, and one-third spent hops, that is to say, the strobiles of hops which have been used by brewers.

I cut the stems fine, and mix an equal amount of hops with them.

I then add to the above the leaf tobacco, and cut the whole in the usual manner of making fine tobacco for smoking.

For chewing-tobacco, I soak the hops in a solution of tobacco until they are thoroughly saturated.

One-third of the hops thus saturated is mixed with equal quantities of leaf-tobacco, sugar, and liquorice. This mixture is then cut into fine shreds in the usual manner of manufacturing fine-cut chewing-tobacco.

The hops serve as a means for uniting the stems and leaf-tobacco, so that they will hold together during the operation of cutting, and also afterward.

The hops will also sweeten tobacco which, from long standing or other cause, has become a little sour or musty.

A very fine article can be produced by mixing the hops with the leaves, omitting the stems, and cutting as described, but this article will, of course, be more expensive than if the stems were added.

I prefer to adopt the relative proportions of the substances herein mentioned, but do not confine myself to these precise proportions, as they may be mixed according to circumstances.

Having described my invention,

I claim as new and desire to secure by Letters Patent—

The mode, substantially as herein described, of preparing and improving tobacco.

SAMUEL G. RICE.

Witnesses:
JOHN S. RICE,
BYRON ESKERSON.